United States Patent
Eriksen et al.

(10) Patent No.: US 10,752,209 B2
(45) Date of Patent: Aug. 25, 2020

(54) SYSTEM AND METHOD FOR WIRELESSLY LINKING ELECTRONIC COMPONENTS AND/OR SENSORS USING SUB-1 GHZ FREQUENCIES (700-1000 MHZ) FOR LONG RANGE, ROBUSTNESS IN WET ENVIRONMENT AND HIGHLY RESISTANT TO WIRELESS NOISE

(71) Applicant: FELL Technology AS, Drammen (NO)

(72) Inventors: Fredrik Eriksen, Oslo (NO); Christian Frost Røine, Drammen (NO)

(73) Assignee: Fell Technology AS, Drammen (NO)

( * ) Notice: Subject to any disclaimer, the term of this patent is extended or adjusted under 35 U.S.C. 154(b) by 0 days.

(21) Appl. No.: 16/273,730

(22) Filed: Feb. 12, 2019

(65) Prior Publication Data

US 2019/0254095 A1 Aug. 15, 2019

Related U.S. Application Data

(60) Provisional application No. 62/629,225, filed on Feb. 12, 2018, provisional application No. 62/629,234, (Continued)

(51) Int. Cl.
*H04W 4/00* (2018.01)
*B60R 25/24* (2013.01)
(Continued)

(52) U.S. Cl.
CPC .............. *B60R 25/24* (2013.01); *B60R 25/04* (2013.01); *B60R 25/209* (2013.01); *B60R 25/23* (2013.01); *B60R 25/31* (2013.01); *G07C 9/00174* (2013.01); *G07C 9/00309* (2013.01); *G07C 9/00857* (2013.01); *H04L 12/40* (2013.01);
(Continued)

(58) Field of Classification Search
CPC ....... B60R 25/24; B60R 25/04; B60R 25/209; B60R 25/23; B60R 25/31; H04W 4/38; H04W 4/44; H04W 76/15; H04W 12/0802; G07C 9/00174; G07C 9/00309; G07C 9/00857; H04L 12/40
USPC ........ 370/254–255, 338, 328–330, 312–313, 370/419–420, 463
See application file for complete search history.

(56) References Cited

U.S. PATENT DOCUMENTS

| 725,605 A | 4/1903 | Tesla |
| 3,786,892 A | 1/1974 | Horton |

(Continued)

FOREIGN PATENT DOCUMENTS

| GB | 2286247 | 1/1995 |
| WO | 9735738 | 3/1997 |
| WO | WO2017035590 | 3/2017 |

OTHER PUBLICATIONS

Notice of Allowance for U.S. Appl. No. 16/273,710, dated Nov. 8, 2019, including "Notice of References Cited" and comments regarding same in statement of reasons for allowance.
(Continued)

*Primary Examiner* — Thai D Hoang
(74) *Attorney, Agent, or Firm* — AWA Sweden AB; Thomas L. Ewing (57) ABSTRACT

An embodiment of the invention provides a system and method for wirelessly linking electronic marine components using Sub-1 GHz frequencies for long range, robustness in wet environment and highly resistant to wireless noise.

8 Claims, 4 Drawing Sheets

Related U.S. Application Data filed on Feb. 12, 2018, provisional application No. 62/629,239, filed on Feb. 12, 2018.

(51) Int. Cl.

| | | |
|---|---|---|
| *H04L 12/40* | (2006.01) | |
| *B60R 25/20* | (2013.01) | |
| *B60R 25/23* | (2013.01) | |
| *B60R 25/31* | (2013.01) | |
| *H04W 4/44* | (2018.01) | |
| *H04W 12/08* | (2009.01) | |
| *G07C 9/00* | (2020.01) | |
| *B60R 25/04* | (2013.01) | |
| *H04W 4/38* | (2018.01) | |
| *H04W 76/15* | (2018.01) | |
| *B63H 21/21* | (2006.01) | |
| *H04W 84/18* | (2009.01) | |

(52) U.S. Cl.
CPC ............ *H04W 4/38* (2018.02); *H04W 4/44* (2018.02); *H04W 12/0802* (2019.01); *H04W 76/15* (2018.02); *B60R 2325/101* (2013.01); *B60R 2325/108* (2013.01); *B60R 2325/205* (2013.01); *B63H 2021/216* (2013.01); *G07C 2009/00388* (2013.01); *G07C 2009/00412* (2013.01); *H04L 2012/40215* (2013.01); *H04L 2012/40273* (2013.01); *H04W 84/18* (2013.01)

(56) References Cited

U.S. PATENT DOCUMENTS

| | | | |
|---|---|---|---|
| 3,889,089 A | 6/1975 | Tomlin | |
| 4,250,358 A | 2/1981 | Gilbertson | |
| 5,019,804 A | 3/1991 | Fraden | |
| 5,229,648 A | 7/1993 | Sues et al. | |
| 5,349,329 A | 9/1994 | Smith | |
| 5,396,215 A | 3/1995 | Hinkle | |
| 5,486,814 A | 1/1996 | Quinones | |
| 5,552,773 A | 9/1996 | Kuhnert | |
| 5,642,095 A | 6/1997 | Cook | |
| 5,838,227 A | 11/1998 | Murray | |
| 5,936,412 A | 8/1999 | Gershenfeld | |
| 6,091,330 A | 7/2000 | Swan et al. | |
| 6,140,935 A | 10/2000 | Hayton et al. | |
| 6,144,112 A | 11/2000 | Gilmore | |
| 6,150,928 A | 11/2000 | Murray | |
| 6,329,913 B1 | 12/2001 | Shieh et al. | |
| 6,450,845 B1 | 9/2002 | Snyder et al. | |
| 6,476,708 B1 | 11/2002 | Johnson | |
| 6,509,747 B2 | 1/2003 | Nagai et al. | |
| 6,566,997 B1 | 5/2003 | Bradin | |
| 6,603,388 B1 | 8/2003 | Perraud | |
| 6,650,227 B1 | 11/2003 | Bradin | |
| 6,661,115 B2 | 12/2003 | Lester | |
| 6,801,134 B1 | 10/2004 | Juzswik | |
| 6,825,765 B2 | 11/2004 | Stanley | |
| 6,909,946 B1 | 6/2005 | Kabel | |
| 7,081,028 B1 | 7/2006 | Crane | |
| 7,201,619 B1 | 4/2007 | Viggiano | |
| 7,355,518 B1 | 4/2008 | Staerzl | |
| 8,755,787 B2 * | 6/2014 | Twitchell, Jr. | H04W 36/18 455/422.1 |
| 9,047,494 B1 | 6/2015 | Smith | |
| 2006/0028353 A1 | 2/2006 | Mueller | |
| 2008/0013514 A1 * | 1/2008 | Lee | H04W 74/0808 370/338 |
| 2009/0322510 A1 * | 12/2009 | Berger | G06Q 10/08 340/539.1 |
| 2010/0150122 A1 * | 6/2010 | Berger | H04W 4/90 370/338 |
| 2012/0105198 A1 | 5/2012 | Nakashima | |
| 2012/0176976 A1 * | 7/2012 | Wells | H04W 72/0486 370/329 |
| 2014/0301270 A1 * | 10/2014 | Johnsson | H04W 72/042 370/328 |
| 2015/0123810 A1 * | 5/2015 | Hernandez-Rosas | ............... A61B 5/14503 340/870.02 |
| 2015/0182115 A1 * | 7/2015 | DeHennis | G16H 40/63 600/316 |
| 2015/0276925 A1 * | 10/2015 | Scholten | A61B 5/0002 702/150 |
| 2016/0087554 A1 | 3/2016 | Nohra | |
| 2016/0231414 A1 * | 8/2016 | Steiner | G01S 19/11 |
| 2017/0331846 A1 | 11/2017 | Hall | |
| 2018/0075200 A1 * | 3/2018 | Davis | G16H 50/30 |
| 2018/0121150 A1 * | 5/2018 | Lin | H04M 3/563 |
| 2018/0160283 A1 * | 6/2018 | Stamatakis | H04W 4/38 |
| 2019/0052995 A1 * | 2/2019 | Agrawal | H04B 17/30 |
| 2019/0125224 A1 * | 5/2019 | Kamath | G16H 20/17 |
| 2019/0171590 A1 * | 6/2019 | Mishra | G06F 3/0655 |
| 2020/0068529 A1 * | 2/2020 | Douglas | H04W 76/11 |

OTHER PUBLICATIONS

International Search Report and Written Opinion dated May 8, 2019 in Application No. PCT/EP2019/053456.
Key Priorities for Sub GHz Wireless Deployments, Silicon Laboratories Inc., Austin, TX, retrieved Feb. 2, 2018.

* cited by examiner

SYSTEM AND METHOD FOR WIRELESSLY LINKING ELECTRONIC COMPONENTS AND/OR SENSORS USING SUB-1 GHZ FREQUENCIES (700-1000 MHZ) FOR LONG RANGE, ROBUSTNESS IN WET ENVIRONMENT AND HIGHLY RESISTANT TO WIRELESS NOISE

CROSS-REFERENCE TO RELATED APPLICATIONS

The present application is related to co-filed U.S. provisional patent application Ser. No. 62/629,225 entitled, "Secure Key Acknowledgement—Frequency Dilution;" U.S. provisional patent application Ser. No. 62/629,234 entitled, "System and Method for Wirelessly Linking Electronic Components and/or Sensors Using Sub-1 GHz Frequencies (700-1000 MHz) for Long Range, Robustness in Wet Environment and Highly Resistant to Wireless Noise," and U.S. provisional patent application Ser. No. 62/629,239 entitled, "A System and Method for Combining a Wireless Device, Such as a Key or Other Device with a Wireless Kill Switch." These related applications are incorporated herein by reference in their entirety.

FIELD

Embodiments of the invention relate to systems and methods pertaining to electronic systems for wirelessly linking electronic and electro-mechanical components and utility equipment. More particularly, an embodiment of the invention relates to systems and methods that employ electronics to provide a system and method for wirelessly linking electronic components and/or sensors using sub-1 GHz frequencies (700-1000 MHz) for long range, robustness in wet environment and highly resistant to wireless noise, making a much higher threshold for hacking or unwanted access.

BACKGROUND

The following description includes information that may be useful in understanding embodiments of the invention. It is not an admission that any of the information provided herein is prior art or relevant to the presently claimed invention, or that any publication specifically or implicitly referenced is prior art.

Marine components and/or sensors such as, but not limited to, depth transducers, GPS receivers, temperature sensors, moisture sensors, proximity sensors, weather sensors and autopilots (hereinafter called "marine components") have conventionally been connected together with or to other equipment for interfacing or information transmission using application-specific wires, in particular, application-specific wires.

Similar issues and problems exist in other problem domains outside the marine area. Thus, there exists a need for better linking components together of all types and for a wide variety of problem domains.

Therefore, a need exists for a more advanced solution that can perform an expanded set of tasks at an improved rate of performance over conventional devices found in the prior art.

SUMMARY OF THE INVENTION

Embodiments of the invention provide a system for and method for wirelessly linking electronic sensors and components using Sub-1 GHz frequencies for long range, robustness in wet environments while remaining highly resistant to wireless noise. The electronic sensors and components may be linked using a high frequency (e.g., Bluetooth) pairing process while still out of range each other with the pairing process facilitated by a device such as a mobile phone. Following the pairing process, then the sensors may communicate using Sub-1 GHz communications. This pairing process may be used to build networks of paired electronic sensors and components, especially in rugged and difficult environments, such as the marine environment. Embodiments of the invention reduce or eliminate the need for application-specific wiring between electronic components and electronic sensors.

BRIEF DESCRIPTION OF THE DRAWINGS

Figures provided herein may or may not be provided to scale. The relative dimensions or proportions may vary. Embodiments of the invention may be sized to fit within a variety of products and components.

DETAILED DESCRIPTION OF AN EMBODIMENT OF THE INVENTION

Embodiments of the invention provide a system and method that reduces or eliminates the need for application-specific wiring between one or multiple component pairs, by providing a wireless link utilizing frequencies below 1 GHz to transmit information. Thus, embodiments of the invention provide a system and method for wirelessly linking electronic marine components using Sub-1 GHz frequencies for long range, robustness in wet environment and highly resistant to wireless noise. Embodiments of the invention also provide a system and method for wirelessly linking electronic components together in domains outside purely marine applications.

As used herein, a "module" means a component comprising the hardware that performs transmission or receipt of the relevant data for the component in question. A given module may be integrated into a larger device or operate as a standalone component.

In a nutshell, embodiments of the invention enable the following. Assume a sensor having a sub1 GHz transceiver (and possibly even a higher frequency transceiver like a Bluetooth transceiver) and assume further a device having a sub1 GHz transceiver (and possibly even a higher frequency transceiver like a Bluetooth transceiver) that is capable of receiving data from the sensor. We could further assume that the device is located in a vehicle or vessel, although this configuration may only occur in some embodiments of the invention.

A mobile phone (e.g., a smartphone) may be used to pair the sensor (and its data) with the device. After this pairing is done no additional interface with the mobile phone is necessary.

The mobile phone may initiate the pairing either to the sensor or the receiving device. When the pairing is initiated the unit which the pairing was initiated on (e.g., the sensor or the receiving device), may either wait for the other unit (e.g., the sensor or the receiving device) to transmit data (or message of another type) or the first unit may actively transmit something (e.g., data) to initiate pairing either via a high frequency transceiver (e.g., Bluetooth) or by a Sub1 GHz transmission to each other.

Once this pairing is completed, the receiving device does not necessarily need to send anything to the sensor for the sensor to return data, and the sensor can sending data to the receiver on intervals or events that are predefined or configurable (e.g., via the mobile phone).

Figure 1:
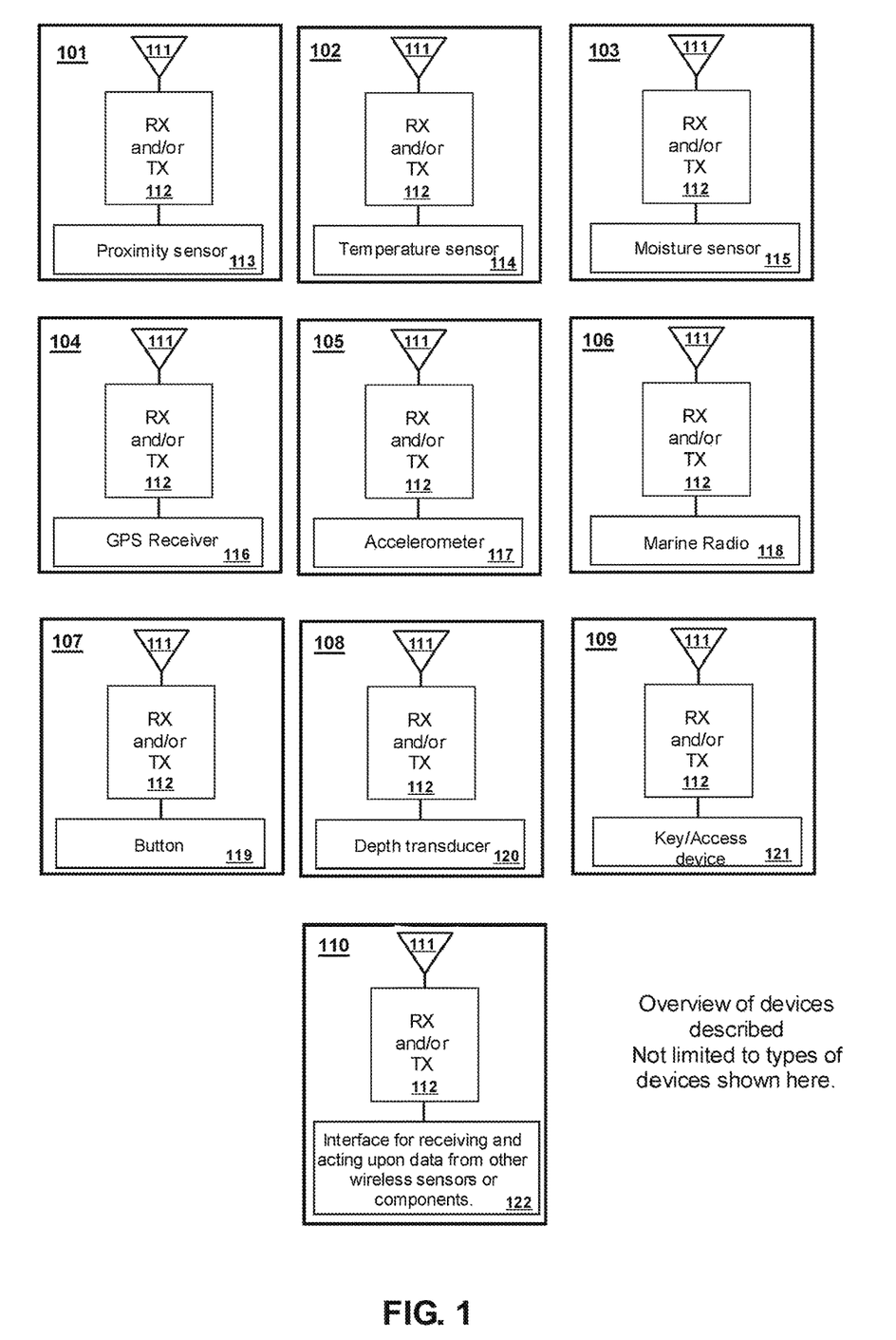
FIG. 01 illustrates a variety of devices that may be suitable for operation with the communication device disclosed herein, according to various embodiments of the invention.

FIG. 01 illustrates a variety of devices that may be suitable for operation with the communication device disclosed herein, according to various embodiments of the invention.

FIG. 01 shows a number of devices 101-110 having communications capabilities. Each of the devices 101-110 includes a transceiver 111 capable of transmitting and receiving data in a marine environment, according to an embodiment of the invention.

Figure 3:
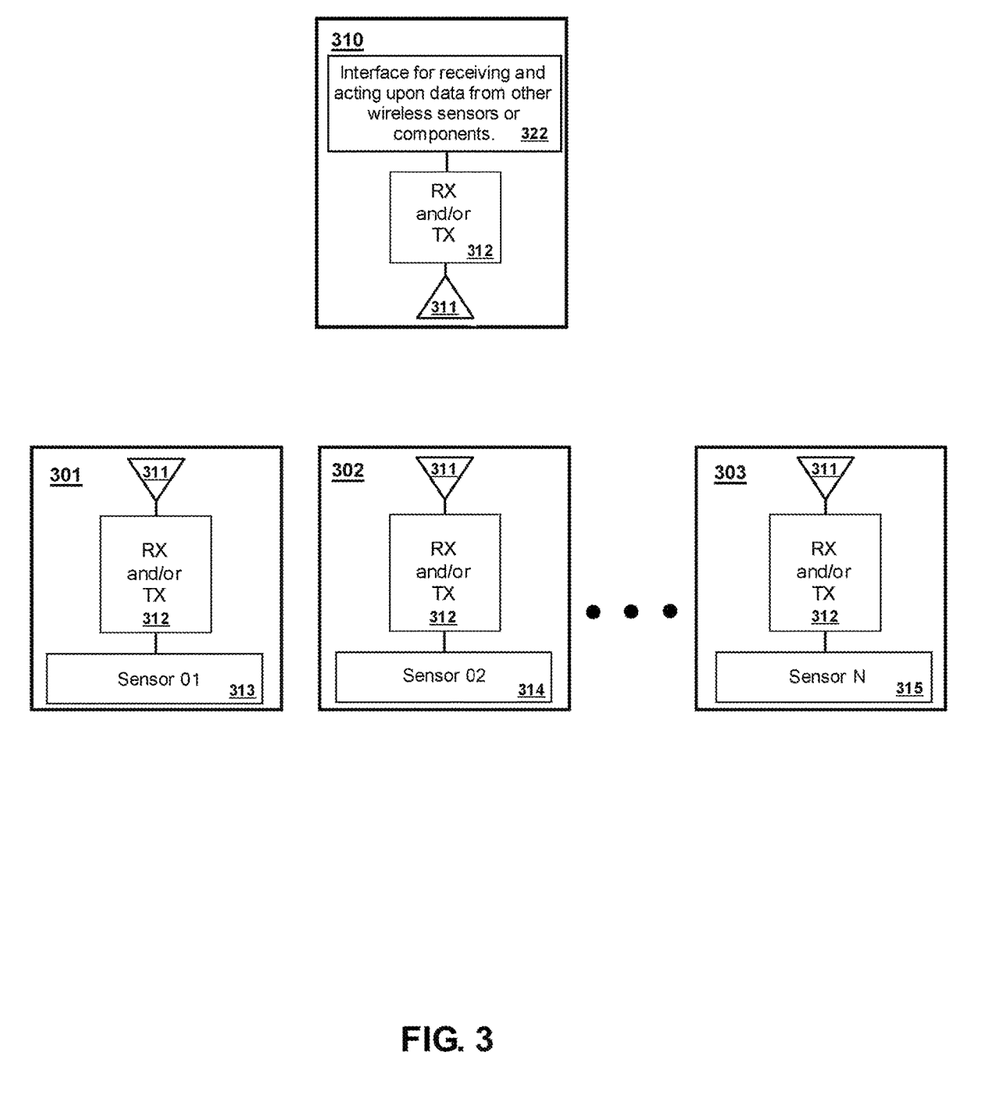
FIG. 03 illustrates a network of sensors 313-315 communicating their data to an interface 322, according to an embodiment of the invention.

Each of the devices 101-110 further comprises a unique component that may be engaged by a remote device (not shown in FIG. 03) using a variety of communication mechanisms (e.g., wireless communications).

The components in the devices 101-110 may include a proximity sensor (113) in device 101; a temperature sensor (114) in device 102; a moisture sensor (115) in device 103; a GPS receiver (116) in device 104; an accelerometer (117) in device 105; a marine radio (118) in device 106; a button (119) in device 107, wherein the button is configured to receive an actuation signal; a depth transducer (120) in device 108; a key/access device (121) in device 109, and an interface for receiving and acting on data from other wireless sensor or components (122) in device 110, according to an embodiment of the invention. Other components may also be integrated into embodiments of the invention.

The components 113-122 may transmit relevant data to remote devices via their respective transceiver 111, and the components 113-122 may also receive commands and other data from remote devices. Of course, in some embodiments of the invention the transceiver 111 may be replaced with just a transmitter or just a receiver, although in a typical embodiment the devices 101-110 will be capable of both sending and receiving data from remote devices.

The components 113-122 may comprise a variety of form factors; however, the typical size for these units is approximately 1 inch by 1 inch by 0.2 inches, according to an embodiment of the invention. For many devices and sensors, one of the main drivers of their size relates to the size of the antenna for wireless communications, which is another reason why some embodiments of the invention employ Sub-1 GHz communications.

The transceivers 111 shown in FIG. 01 operate at relatively medium frequencies in the sub-1 GHz range. In particular, the transceivers 111 operate in the 700-1000 MHz range, according to an embodiment of the invention. This frequency range has been determined by the inventors to provide optimal performance for communication of sensor data, especially for sensors having relatively low data rates. This frequency range may also be applied when the transceivers 111 are replaced with mere transmitters, according to an embodiment of the invention.

Kabel and Burrell ("Kabel") disclose in U.S. Pat. No. 6,909,946 a similar system to the one disclosed in FIG. 01 above. However, Kabel discloses the application of communications using the Bluetooth and Wi-Fi protocols. Kabel suggests that by operating at high frequencies (e.g., 2.4 GHz) that communications for these devices are relatively immune from interference.

Kabel's disclosed invention is intended to operate in a marine environment. While high frequency communications may be useful for some marine applications, many devices (e.g., sensors) will be situated at distances and in environments in which high frequency communications perform poorly. For low data-rate applications, such as many of the sensor types contemplated by the applicants' invention, sub-1 GHz wireless systems offer several advantages, including longer range, reduced power consumption and lower deployment and operating costs. Sub-1 GHz transceivers can offer relatively simple wireless solutions that can operate uninterrupted on battery power alone for up to 20 years, according to an embodiment of the invention.

The frequency range here has not been arbitrarily chosen by the inventors but instead has been based on a number of careful considerations and experimentation. Just as the high frequency domain is inapplicable, the low frequency domain is also inapplicable. For example, certain frequency ranges, such as very low frequencies, typically require very long antennas. Many of the sensor packages that can be deployed in various embodiments of the invention tend to be very small themselves (e.g., accelerometers and tire pressure sensors), and it somewhat defeats the purpose of using such tiny components if they require a very long length antenna to communicate data from the sensor. Thus, the inventors have discovered that very low frequency antennas while offering some advantages also offer a number of disadvantages as well.

The narrowband operation of a sub-1 GHz devices enables transmission ranges of a kilometer or more. This allows sub-1 GHz sensors to communicate directly with an interface, such as the interface 122 without requiring relay from other devices or sensors, which might be required with much shorter-range 2.4 GHz implementations. The interface 122 comprises an interface (e.g., a physical interface) to another device, according to an embodiment of the invention. Thus, for example, a complicated device that performs many tasks on a vessel might have an interface like the interface 122 to provide data of various kinds. It is also worth nothing that there are three primary reasons for sub-GHz superior range performance over 2.4 GHz applications: (1) As radio waves pass through walls and other obstacles, the signal weakens. Attenuation rates increase at higher frequencies, therefore a 2.4 GHz signal weakens faster than a sub-1 GHz signal; (2) 2.4 GHz waves also fade more quickly than sub-1 GHz waves as they reflect off dense surfaces. In highly congested environments, a 2.4 GHz transmission can weaken rapidly, which adversely affects signal quality; (3) Even though radio waves travel in a straight line, they do bend when they hit a solid edge (like the corner of a building). As frequencies decrease the angle of diffraction increases, allowing sub-1 GHz signals to bend farther around an obstacle, reducing the blocking effect.

For these reasons, the transceivers 111 shown in FIG. 01 operate at comparatively much lower frequencies in the sub-1 GHz range than in a Bluetooth transceiver. In particular, the transceivers 111 operate in the 700-1000 MHz range, according to an embodiment of the invention. In a sense this range of frequencies can be consider to offer the best of both worlds, according to an embodiment of the invention. Transceivers operating on other protocols may be used in embodiments of the invention; e.g., Bluetooth is not essential.

Embodiments of the invention may be amenable to the creation of networks of devices 101-110 that communicate data with each other, and in some instances the communications may be multiple and concurrent, according to an embodiment of the invention. Thus, communications need not be only single point to point communication between one transmitter and one receiver, according to an embodiment of the invention.

Figure 2:
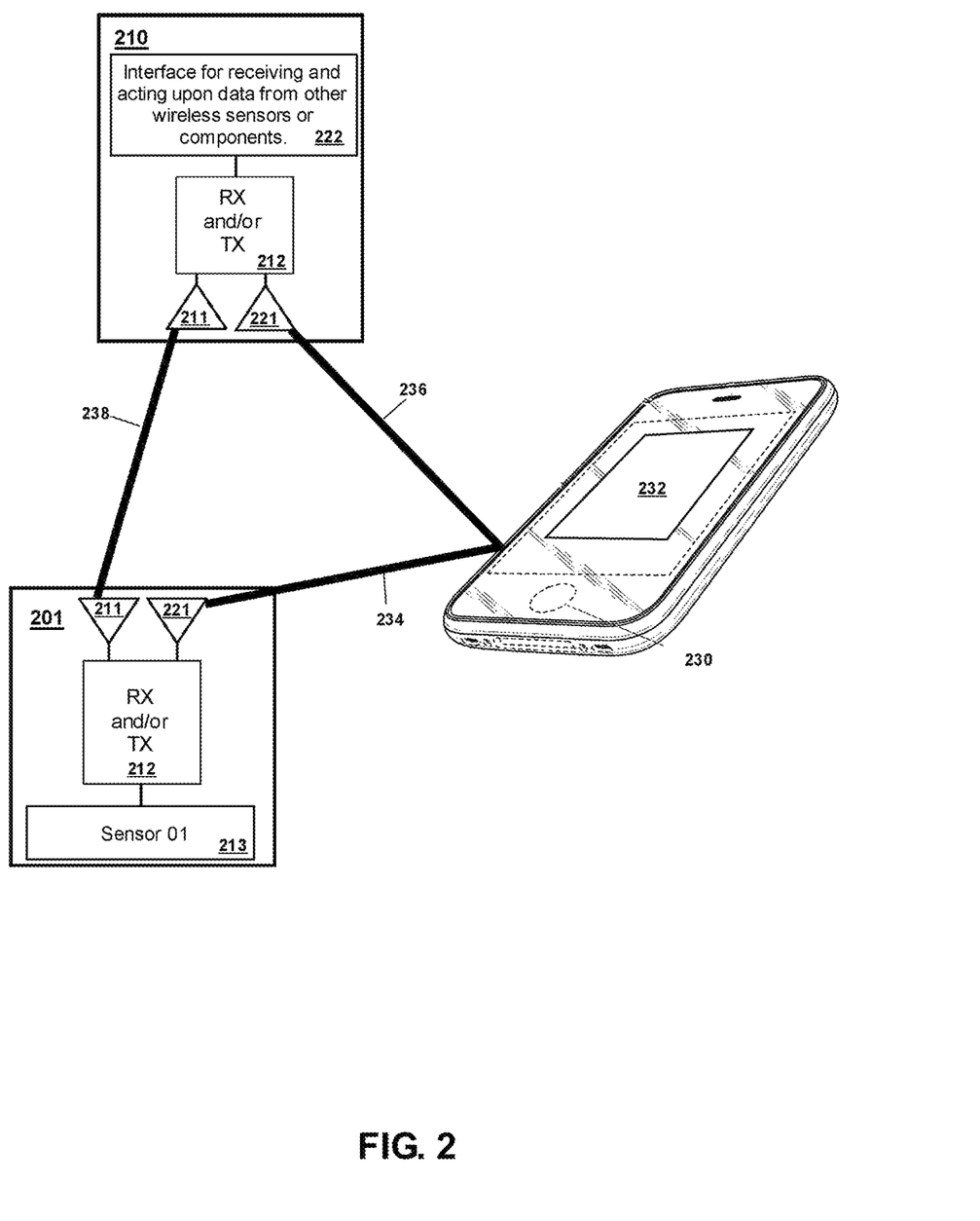
FIG. 02 illustrates a pairing procedure for a sensor 213 in a sensor device 201 paired with an interface 210 with the pairing process directed by a mobile phone 230, according to an embodiment of the invention.

FIG. 02 illustrates a pairing procedure for a sensor 213 in a sensor device 201 paired with an interface 210 with the pairing process directed by a mobile phone 230, according to an embodiment of the invention. The pairing procedure involves the use of a communications protocol (e.g., Bluetooth communications) via the mobile phone 230 with post-pairing communications between the sensor device 201 and the interface 210 conducting using sub-1 GHz communications. This device pairing method simplifies the pairing process while still allowing the paired devices to communicate in the more robust sub-1 GHz range. Using this method, it should not matter if the sensor device 201 and the interface 210 are out of range for communications on a more conventional transceiver (e.g., a Bluetooth transceiver) with each other during the pairing process, so long as they are still in communications range with the mobile phone 230, according to an embodiment of the invention.

The mobile phone 230 includes an application 232 configured to direct the pairing of sensor devices, such as the device 201 and interfaces, such as the interface 210, according to an embodiment of the invention. The application 232 directs a communication (e.g., a Bluetooth communication) to either the sensor device 201 or the interface 210. The sensor device 201 and the interface 210 contain transmitters 221. The transmitters 221 may operate on a conventional protocol, e.g., Bluetooth. The application 232 may start with either the sensor device 201 or the interface 210.

The application 232 collects the information that another device would need to have in order to communicate with the device being interrogated by the application 232. Thus, if the application 232 started first with the sensor device 201 using a communication 234, then the application 232 would collect the information needed by another device to communicate with the sensor device 201. The application 232 then interrogates another device. If the next device interrogated is an interface device, such as the interface 210 via communication 236, then the application 232 provides the interface with the communication information for the sensor device 201.

Now that the interface 210 has been paired with the sensor device 201, then the interface 210 and the sensor device may communicate information 238 via their transceivers 211 using sub-1 GHz communications, according to an embodiment of the invention.

In an embodiment of the invention where the sensor device 201 contains only a transmitter and not a transceiver or receiver capable of communication using sub-1 GHz communications, then the pairing process may begin with the application 232 obtaining the needed communication information from the sensor device 201 and providing this information to the interface 210. Since the sensor device 201 does not contain a receiver, then the senor device 201 cannot send a pairing acknowledgement to the interface 210.

In an alternative embodiment, where the sensor device 201 contains only a transmitter and not a transceiver or a receiver capable of communicating using sub-1 GHz communications, then the pairing process may begin with the application 232 obtaining needed communication information from the interface 210 using the transceiver 221, and then transmitting this information to the sensor device 201 using the transceiver 221 on the sensor device 201. The sensor device 201 may send a pairing acknowledgement using its sub-1 GHz transmitter 211 to the sub-1 GHz receiver (or transceiver) on the interface 210, according to an embodiment of the invention.

Where both the sensor device 201 and the interface 210 contain sub-1 GHz transceivers, then the application 232 may begin with either device, according to an embodiment of the invention.

Other devices (e.g., Bluetooth-enabled devices) apart from a mobile phone may direct the pairing process, according to an embodiment of the invention. In addition, in some embodiments of the invention, the pairing procedure may not require a mobile phone at all but may be conducted by another device, and/or may be completed by the sensors without assistance from a third device.

FIG. 03 illustrates a network of sensors 313-315 communicating their data to an interface 322, according to an embodiment of the invention.

The sensors 313-315 may comprise a variety of sensor types, such as those shown in FIG. 01. The sensors 313-315 may be unique sensor types or divergent sensor types, e.g., they may be all the same, all different, or a mix. The network shown in FIG. 03 is not limited to just three sensor devices, as indicated by the label "Sensor N" for sensor 315, according to an embodiment of the invention.

The interface 322 may comprise a device that displays the sensor readings from the sensors 313-315 and/or it may be a device that passes the data from the sensors onto other devices for display and/or processing, according to an embodiment of the invention.

The sensors 313-315 communicate with the interface 322 via transceivers 311. In some embodiments of the invention, the sensors 313-315 may comprise just transmitters, and the interface 322 may comprise just an antenna. In some embodiments of the invention, a refresh rate for the sensors may be configurable, allowing users to adjust the refresh rate for the sensors 313-315313-315, which may be helpful when a given sensor device includes multiple internal sensors, according to an embodiment of the invention. The refresh rate may also be adjustable via an application, such as the application 232 on the mobile phone 230 shown in FIG. 02.

Figure 4:
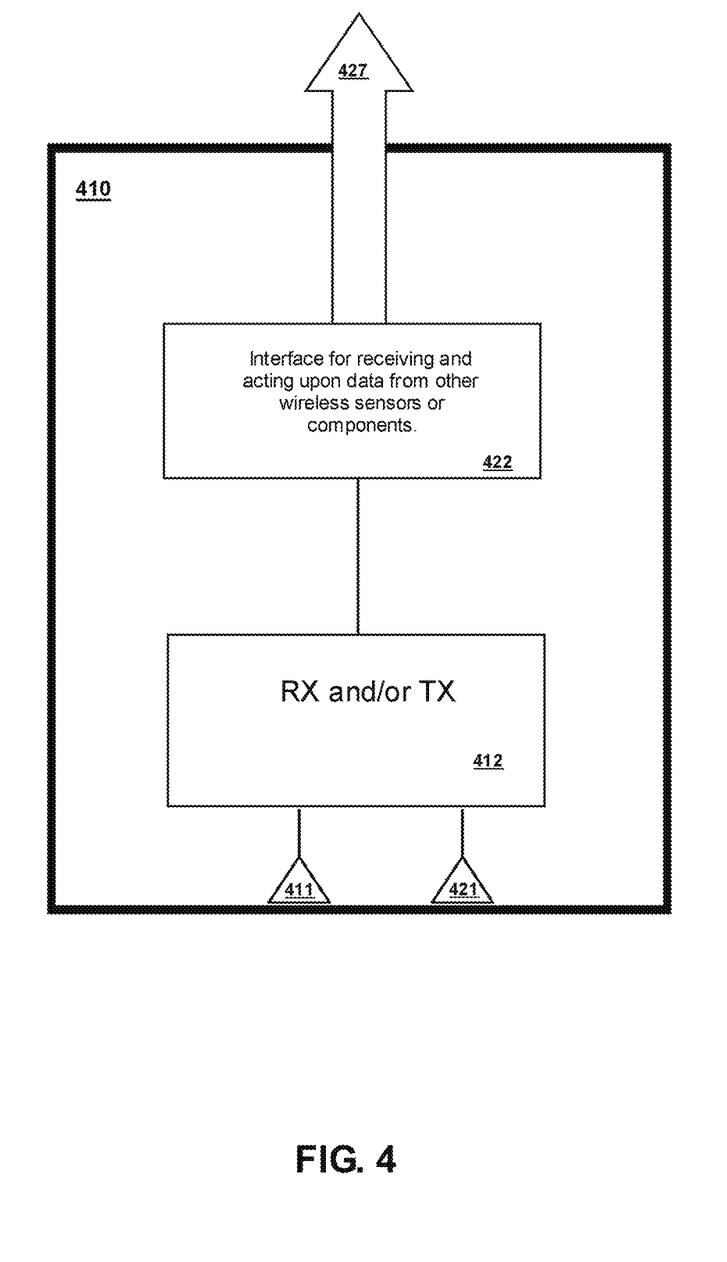
FIG. 04 illustrates an embodiment of the sensor interface 410 that resembles the interface 222 shown in FIG. 02.

FIG. 04 illustrates an embodiment of the sensor interface 410 that resembles the interface 222 shown in FIG. 02.

The interface 410 may comprise a device that displays the sensor readings from the sensors and/or it may be a device that passes the data from the sensors onto other devices for display and/or processing, according to an embodiment of the invention.

The interface 410 includes a sub-1 GHz transceiver 211 that receives data from various. sensors. The interface 410 also includes a transceiver 421 (e.g., a Bluetooth transceiver) the communicates pairing information with a mobile device, such as the process illustrated in FIG. 03.

The interface 410 includes control circuitry 422 that not only directs operations of the transceivers but also determines what to do with data received from the sensors. In some embodiments of the invention, the control circuitry 422 may direct data received from sensors to be transmitted to other devices via an integrated bus 427 to another device. Thus, for example, the interface 410 may receive data from a remote sensor (e.g., the sensor 314 shown in FIG. 03), and the control circuitry 422 may direct that this data be sent via bus 427 to a remote device which happens to be a display device configured to provide a graphical display of the transmitted data, according to an embodiment of the invention. Similarly, data transmitted along the bus 427 may cause another device to take an action of some sort (e.g., turn off an engine).

In some embodiments of the invention, the control circuity may direct that data received via the sub-1 GHz transceiver 411 be transmitted to another mobile device via the transceiver 421. The mobile device could possibly be a mobile phone which might transmit the received data via cloud for display and/or action by another device, according to an embodiment of the invention. The data transmitted to the mobile device may simply be displayed by the device, according to an embodiment of the invention.

Various embodiments of the invention have been described in detail with reference to the accompanying drawings. References made to particular examples and implementations are for illustrative purposes, and are not intended to limit the scope of the invention or the claims.

It should be apparent to those skilled in the art that many more modifications of the invention besides those already described are possible without departing from the inventive concepts herein. The inventive subject matter, therefore, is not to be restricted except by the scope of the appended claims. Moreover, in interpreting both the specification and the claims, all terms should be interpreted in the broadest possible manner consistent with the context.

Headings and sub-headings provided herein have been provided as an assistance to the reader and are not meant to limit the scope of the invention disclosed herein. Headings and sub-headings are not intended to be the sole or exclusive location for the discussion of a particular topic.

While specific embodiments of the invention have been illustrated and described, it will be clear that the invention is not limited to these embodiments only. Embodiments of the invention discussed herein may have generally implied the use of materials from certain named equipment manufacturers; however, the invention may be adapted for use with equipment from other sources and manufacturers. Equipment used in conjunction with the invention may be configured to operate according to conventional protocols (e.g., Wi-Fi) and/or may be configured to operate according to specialized protocols. Numerous modifications, changes, variations, substitutions and equivalents will be apparent to those skilled in the art without departing from the spirit and scope of the invention as described in the claims. In general, in the following claims, the terms used should not be construed to limit the invention to the specific embodiments disclosed in the specification, but should be construed to include all systems and methods that operate under the claims set forth hereinbelow. Thus, it is intended that the invention covers the modifications and variations of this invention provided they come within the scope of the appended claims and their equivalents.

It should be noted that while many embodiments of the invention described herein are drawn to a smart wireless invention, various configurations are deemed suitable and may employ various computing devices including servers, interfaces, systems, databases, agents, engines, controllers, or other types of computing devices operating individually or collectively. One should appreciate that any referenced computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclosed smart invention.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. The terms "coupled to" and "coupled with" are also used euphemistically to mean "communicatively coupled with" where two or more networked devices are able to send or receive data over a network.

We claim:

1. A wireless sensing system, comprising:
    a first sensor configured to collect first data, the first sensor having a first sub-1 GHz transceiver;
    a first interface configured to receive the first data, the first interface having a second sub-1 GHz transceiver; and
    an application on a mobile phone having a transceiver, wherein the application interrogates the first sensor using the transceiver to obtain connection data for the first sensor and interrogates the first interface using the transceiver to obtain connection data for the first interface, wherein the application is further configured to direct the transceiver to provide the first sensor with connection data for the first interface and to provide the first interface with connection data for the first sensor, wherein the first interface sends a connection message by the second sub-1 GHz transceiver to the first sensor via the first sub-1 GHz transceiver, the connection message notifying the first sensor to send the first data to the first interface via the first sub-1 GHz transceiver.

2. The wireless sensing system of claim 1 wherein the first sensor comprises one of a proximity sensor, a temperature sensor, a moisture sensor, a GPS receiver, an accelerometer, a marine radio, a button, a depth transducer, a key/access device, and an interface for receiving and acting on data from other wireless sensor or components.

3. The wireless sensing system of claim 1 wherein the first sub-1 GHz transceiver operates in the 700-1000 MHz range.

4. The wireless sensing system of claim 1, further comprising:
    a plurality of sensors, each sensor of the plurality of sensors configured to collect data, each sensor of the plurality of sensors having a sub-1 GHz transceiver;
    a plurality of interfaces, each interface of the plurality of interfaces configured to receive data collected by a sensor of the plurality of sensors, the interface of the plurality of interfaces having a sub-1 GHz transceiver,
    wherein the application on the mobile phone interrogates each sensor of the plurality of sensors to obtain connection data using the transceiver on the mobile phone to communicate with each sensor of the plurality of sensors, the application further configured to transmit the connection data via the transceiver on the mobile phone to each interface of the plurality of interfaces, wherein each interface of the plurality of interfaces sends a connection message by the sub-1 GHz transceiver of the interface of the plurality of interfaces to the sensor of the plurality of sensors via the sub-1 GHz transceiver of the plurality of sensors, the connection message notifying the sensor of the plurality of sensors to send the data to the interface of the plurality of interfaces via the first sub-1 GHz transceiver.

5. The wireless sensing system of claim 4 wherein each sensor of the plurality of sensors comprises one of a proximity sensor, a temperature sensor, a moisture sensor, a GPS receiver, an accelerometer, a marine radio, a button, a depth transducer, a key/access device, and an interface for receiving and acting on data from other wireless sensor or components.

6. The wireless sensing system of claim 1 wherein the first interface further comprises control circuity configured to take an action based on the first data received from the first sensor.

7. The wireless sensing system of claim 6 wherein the control circuitry is configured to transmit the first data received from the first sensor via a bus to a graphical display that displays the received first data.

8. The wireless sensing system of claim 6 wherein the control circuity is configured to transmit the first data to a remote device.

* * * * *